United States Patent
Ogino

(10) Patent No.: US 8,329,602 B2
(45) Date of Patent: Dec. 11, 2012

(54) OPTICAL GLASS

(75) Inventor: Michiko Ogino, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 248 days.

(21) Appl. No.: 12/848,500

(22) Filed: Aug. 2, 2010

(65) Prior Publication Data

US 2011/0034314 A1 Feb. 10, 2011

Related U.S. Application Data

(63) Continuation-in-part of application No. 10/592,148, filed as application No. PCT/JP2005/004590 on Mar. 9, 2005, now abandoned.

(30) Foreign Application Priority Data

Mar. 10, 2004 (JP) .................................. 2004-67117
Sep. 24, 2004 (JP) .................................. 2004-276916

(51) Int. Cl.
*C03C 13/04* (2006.01)
*C03C 3/089* (2006.01)
*C03C 3/078* (2006.01)
*C03C 3/064* (2006.01)

(52) U.S. Cl. ............. 501/37; 501/65; 501/72; 501/77

(58) Field of Classification Search ............ 501/37, 501/73, 75, 77, 65, 72
See application file for complete search history.

(56) References Cited

U.S. PATENT DOCUMENTS

| | | | |
|---|---|---|---|
| 3,460,954 A | 8/1969 | Young | |
| 4,019,888 A | 4/1977 | Verhappen et al. | |
| 4,418,985 A | 12/1983 | Kasori et al. | |
| 4,472,030 A | 9/1984 | Tachibana et al. | |
| 4,481,299 A | 11/1984 | Tajima | |
| 5,374,595 A * | 12/1994 | Dumbaugh et al. | ............ 501/66 |
| 6,251,813 B1 | 6/2001 | Sato | |
| 6,515,795 B1 * | 2/2003 | Dejneka et al. | ............ 359/341.5 |
| 6,816,235 B2 * | 11/2004 | Kido et al. | ............ 355/67 |
| 2009/0069165 A1 * | 3/2009 | Fu | ............ 501/42 |
| 2009/0069166 A1 | 3/2009 | Fu | |

FOREIGN PATENT DOCUMENTS

| | | |
|---|---|---|
| JP | 50-033211 A | 3/1975 |
| JP | 2795326 B2 | 9/1998 |
| JP | 11-92173 A | 4/1999 |
| JP | 2000-264675 A | 9/2000 |

OTHER PUBLICATIONS

International Search Report of PCT/JP2005/004590, mailing date of Aug. 8, 2005.

* cited by examiner

*Primary Examiner* — Noah Wiese
(74) *Attorney, Agent, or Firm* — Westerman, Hattori, Daniels & Adrian, LLP

(57) ABSTRACT

An optical glass has a refractive index (nd) of 1.60 or over and excellent transmittance and internal quality. The optical glass comprises 0.1-4 mass % of $Ta_2O_5$ to total mass of glass calculated on oxide basis, has ratio of $0.95 < Ta_2O_5/(Ta_2O_5+(ZrO_2)+TiO_2+Nb_2O_5+WO_3) \times 5) \leq 1.00$, and further comprises $SiO_2+B_2O_3+Al_2O_3+BaO$ in a total amount of 81% or over.

17 Claims, No Drawings

OPTICAL GLASS

CROSS-REFERENCE TO RELATED APPLICATIONS

This application is a continuation-in-part of U.S. application Ser. No. 10/592,148, filed on Sep. 8, 2006, which is a 371 of International Application No. PCT/JP2005/004590 filed on Mar. 9, 2005 which is based upon and claims the benefit of priority from the prior Japanese Patent Application No. 2004-067117, filed on Mar. 10, 2004 and Japanese Patent Application No. 2004-276916, filed on Sep. 24, 2004, the entire contents of which are incorporated herein by reference.

TECHNICAL FIELD

This invention relates to an optical glass having a refractive index (nd) of 1.55 or over, preferably 1.60 or over and having excellent transmittance and internal quality.

Particularly, the present invention relates to an optical glass for an optical fiber having optical constants including a refractive index of 1.55 or over, preferably 1.60 or over and Abbe number (vd) within a range from 50 to 60, having excellent transmittance without being affected by oxidation-reduction atmosphere, having a small mean coefficient $\alpha$ of linear thermal expansion within a temperature range from 100° C. to 300° C., and having sufficient resistance to devitrification and excellent internal quality.

Glasses having excellent transmittance have recently been used in the form in which such glasses are applied to and incorporated into various devices. Particularly, these glasses are utilized for a core portion of a multi-component glass optical fiber used as a light guide and image guide for medical uses and also for a glass lens for i-line used for an exposure device for semiconductors (reference is made to the catalog of glass lens for i-line published by Kabushiki Kaisha Ohara). In these glasses having excellent transmittance, there has been increasing demand for glasses in which environment contaminating materials such as lead and arsenic are reduced to the maximum extent.

For increasing transfer amount of light in the multi-component glass optical fiber, a glass having as high refractive index (nd) as possible should be used in the core portion and a glass having as low refractive index (nd) as possible should be used in the cladding portion thereby to increase numerical aperture. As the refractive index increases, $SiO_2$ which is a low refractive index, low expansion component generally needs to be reduced and, therefore, the coefficient $\alpha$ of linear thermal expansion tends to increase, whereas as the refractive index decreases, SiO and other low expansion materials are introduced in larger amounts and, therefore, the coefficient $\alpha$ of linear thermal expansion tends to decreases.

If a core material having as high refractive index as possible is used for increasing transfer amount of light, difference in expansion between the core portion and the cladding portion becomes large with resulting lack in adjustment with the cladding material and occurrence of cracks. It is therefore preferable to use, from the standpoint of preferable property of a glass used for the core material, a material which has as high refractive index as possible and as small coefficient of linear thermal expansion as possible. Further, since the optical fiber is often used with a long transmission path and poor transmittance increases transmission loss, excellent transmission throughout the visible region is also an important factor.

It is also important for the glass to have sufficient resistance to devitrification during melting of the glass, for quantity of light is affected by dispersion caused by devitrification and phase separation. For preventing occurrence of devitrification, it is conceivable to raise melting temperature during the manufacturing process. In manufacture of an optical glass, however, there is generally used a melting apparatus in which a part or whole of the apparatus which comes into contact with melting glass is made of platinum or a platinum alloy for preventing occurrence of devitrification and phase separation and, melting of glass at a high temperature and for a long time causes platinum ion to be introduced into the glass by reason of contact of the glass with platinum or a platinum alloy and, as a result, transmittance of the glass is deteriorated. In a glass for which high transmittance is required, deterioration in transmittance due to coloring and dispersion of inclusion caused by platinum ion becomes a serious defect to the glass. In case the glass is used for a core material of an optical fiber reduction in transmittance due to inclusion and phase separation causes a large transmission loss in the optical fiber.

For preventing reaction between platinum ion and a batch to the maximum extent possible in melting the batch, a crucible made of a material which does not include platinum, e.g., a quartz crucible, is sometimes used. In this case, however, impurities which are included in the material of the crucible are fused into the glass in addition to small amounts of impurities which are fused into the glass from the materials of the glass during various mass production processes. These impurities include transition metal components such as Fe and Cr and the glass is colored even when only a small amount of these components are added singly or in combination with the result that absorption takes place in a specific wavelength. It is, therefore, desirable in an optical glass which requires high transmittance to reduce the amounts of these components to the maximum possible extent.

Energy-saving in a melting furnace has rapidly developed in recent years and optical glasses are manufactured by various types of melting furnaces including, as main types, a furnace using heavy oil or gas as a fuel and an electric furnace using electricity. Among these furnaces, oxygen concentration tends to become low in the furnaces using heavy oil or gas and oxygen concentration tends to become high in the electric furnace. The atmosphere in the furnace during melting of a glass undergoes a subtle change also depending upon the melting temperature or other factors and, therefore, control of the atmosphere in the furnace is generally difficult and costly. Particularly, in a glass having excellent transmittance such as the glass of the present invention, oxidation and reduction in the glass has a significant influence to transmittance of the glass and, accordingly, a glass having excellent transmittance which is hardly affected by the oxidation-reduction atmosphere is required.

For these reasons, a glass having high transmittance used for an optical fiber is required to have the following properties:

(1) The glass should not contain environment-contaminating materials such as lead and arsenic.
(2) In optical design, the glass should have a refractive index (nd) of 1.55 or over.
(3) The glass should have as small coefficient $\alpha$ of linear thermal expansion (100-300° C.) as possible.
(4) The glass should have resistance to devitrification and phase separation during melting of the glass.
(5) The glass should not be susceptible to the influence by the oxidation-reduction atmosphere and should have excellent internal transmittance throughout the visible region.
(7) The glass should have excellent transmittance even when a glass having excellent internal quality has been obtained by using a melting apparatus in which a part or whole of the apparatus which comes into contact with the melting glass in forming or spinning of the glass is made of platinum or a platinum alloy.

Japanese Patent Application Laid-open Publication No. Hei 8-119666 discloses a $SiO_2$—$B_2O_3$—$Al_2O_3$—$ZrO_2$—$ZnO$-$baO$—$Li_2O$ glass as a glass having the above described optical constants and being free of the environment-contaminating materials. The glasses of this publication which are specifically disclosed tend to produce inclusion, phase separation and bubbles with resulting difficulty in obtaining a glass having sufficient transmittance.

Japanese Patent Application Laid-open Publication No. Hei 11-92173 discloses a $SiO_2$—$Al_2O_3$—$ZrO_2$—$ZnO$—$CaO$—$BaO$—$Na_2O$ glass and Japanese Patent Application Laid-open Publication No. 2000-264675 discloses a $SiO_2$—$B_2O_3$—$Al_2O_3$—$ZnO$—$CaO$—$BaO$—$Li_2O$ glass. The glasses of these publications which are specifically disclosed tend to produce inclusion with resulting difficulty in obtaining a glass having sufficient transmittance and, moreover, these glasses tend to produce phase separation and therefore are not sufficient for obtaining a glass which will achieve the object of the present invention.

It is, therefore, an object of the present invention to eliminate the above described defects of the prior art glasses comprehensively and provide a glass which is free of environment-contaminating materials, has a refractive index of 1.55 or over, preferably 1.60 or over, Abbe number within a range from 50 to 60, has a small mean coefficient ($\alpha$) of linear thermal expansion (100-300° C.), has excellent resistance to devitrification and excellent internal quality.

DISCLOSURE OF THE INVENTION

For achieving the above described object of the present invention, studies and experiments made by the inventors of the present invention have resulted in the finding, which has led to the invention, that a glass having excellent transmittance and internal quality and a small coefficient of linear thermal expansion can be obtained in a $SiO_2$—$B_2O_3$—$BaO$—$Sb_2O_3$—$Ta_2O_5$ glass of a specific composition and being free of $BaCl_2$, $Nd_2O_3$, $Sm_2O_3$, $As_2O_3$, $CeO_2$, $Fe_2O_3$, and $Pr_2O_3$ which has been unknown to date and that a glass having further excellent transmittance can be obtained by adjusting melting atmosphere on the surface of the glass in the stage of producing a cullet from a batch in a quartz crucible.

For achieving the above described object of the invention, in the first aspect of the invention, there is provided an optical glass being free of a lead compound and an arsenic compound and having internal transmittance of 0.9900 or over at a wavelength within a range from 400 nm to 450 nm and internal transmittance of 0.9980 or over at a wavelength within a range from 600 nm to 700 nm.

In the second aspect of the invention, there is provided an optical glass as defined in first aspect having a refractive index of 1.55 or over.

In the third aspect of the invention, there is provided an optical glass as defined in the second or third aspect comprising 0.1-10 mass % of $Ta_2O_5$ to total mass of glass calculated on oxide basis.

In the fourth aspect of the invention, there is provided an optical glass as defined in any of the first to the third aspects used as core material for an optical fiber.

In the fifth aspect of the invention, there is provided an optical glass as defined in fourth aspect wherein difference in mean coefficient $\alpha$ of linear thermal expansion between the core material and a cladding material for the optical fiber used simultaneously with the core material within a temperature range from 100° C. to 300° C. is within a range from $-15$ ($10^{-7\circ}$ $C.^{-1}$) to $+15$($10^{-7\circ}$ $C.^{-1}$).

In the sixth aspect of the invention, there is provided an optical glass as defined in any of the first to the fifth aspect wherein mean coefficient $\alpha$ of linear thermal expansion within a temperature range from 100° C. to 300° C. is 100 ($10^{-7\circ}$ $C.^{-1}$) or below.

In the seventh aspect of the invention, there is provided an optical glass comprising 0.1-4 mass % of $Ta_2O_5$ to total mass of glass calculated on oxide basis, having ratio of $Ta_2O_5/(Ta_2O_5+(ZrO_2+TiO_2+Nb_2O_5+WO_3)\times5)$ being $0.95<Ta_2O_5/(Ta_2O_5+(ZrO_2+TiO_2+Nb_2O_5+WO_3)\times5)\leq1.00$, and further comprising $SiO_2+B_2O_3+Al_2O_3+BaO$ in a total amount of 81% or over.

In the eighth aspect of the invention, there is provided an optical glass comprising BaO in an amount greater than 40 mass % and not more than 50 mass % and 0.1-4 mass % of $Ta_2O_5$ respectively to total mass of glass calculated on oxide basis, having ratio of $Ta_2O_5/(Ta_2O_5+(ZrO_2+TiO_2+Nb_2O_5+WO_3)\times5)$ being $0.95<Ta_2O_5/(Ta_2O_5+(ZrO_2+TiO_2+Nb_2O_5+WO_3)\times5)\leq1.00$, and further comprising $SiO_2+B_2O_3+Al_2O_3+BaO$ in a total amount of 81% or over.

In the ninth aspect of the invention, there is provided an optical glass having a refractive index (nd) of 1.60 or over, comprising, in mass % to total mass of glass calculated on oxide basis:

| | |
|---|---|
| $SiO_2$ | 25-36% |
| $B_2O_3$ | 5-20% |
| BaO | greater than 40% and not more than 50% and |
| $Ta_2O_5$ | 0.1-4%, | having ratio of $Ta_2O_5/(Ta_2O_5+(ZrO_2+TiO_2+Nb_2O_5+WO_3)\times5)$ being $0.95<Ta_2O_5/(Ta_2O_5+(ZrO_2+TiO_2+Nb_2O_5+WO_3)\times5)\leq1.00$, and further comprising $SiO_2+B_2O_3+Al_2O_3+BaO$ in a total amount of 81% or over.

In the tenth aspect of the invention, there is provided an optical glass having a refractive index (nd) of 1.60 or over, comprising, as essential components and in mass % to total mass of glass calculated on oxide basis:

| | |
|---|---|
| $SiO_2$ | 25-36% |
| $B_2O_3$ | 5-20% |
| BaO | greater than 40% and not more than 50% and |
| $Ta_2O_5$ | 0.1-4% and, | as optional components and in mass % to total mass of glass calculated on oxide basis:

| | |
|---|---|
| $Al_2O_3$ | 0-10% and/or |
| $ZrO_2$ | 0-less than 0.01% and/or |
| $TiO_2$ | 0-0.01% and/or |
| $Nb_2O_5$ | 0-0.01% and/or |
| $WO_3$ | 0-0.01% and/or |
| $Sb_2O_3$ | 0-0.4% and/or |
| ZnO | 0-10% and/or |
| MgO | 0-10% and/or |
| CaO | 0-10% and/or |
| SrO | 0-10% and/or |
| $Li_2O$ | 0-5% and/or |
| $Na_2O$ | 0-5% and/or |
| $K_2O$ | 0-5% and/or | a fluoride or fluorides of a metal element or elements contained in the above metal oxides, a total amount of F contained in the fluoride or fluorides within a range from 0 to 0.5 mass part to 100 mass parts of the glass calculated on oxide basis, having ratio of $Ta_2O_5/(Ta_2O_5+(ZrO_2+TiO_2+Nb_2O_5+WO_3)\times 5)$ being $0.95<Ta_2O_5/(Ta_2O_5+(ZrO_2)+TiO_2+Nb_2O_5+WO_3)\times 5)\leqq 1.00$, and further comprising $SiO_2+B_2O_3+Al_2O_3+BaO$ in a total amount of 81% or over.

In the present specification, the term "comprising, calculated on oxide basis" means that, assuming that oxides, complex salts, metal fluorides etc. which are used as raw materials of the glass components of the optical glass of the present invention have all been decomposed and converted to oxides during the melting process, each component of the glass comprises a particular ratio to the total weight of the converted oxides which is 100 mass %.

In the present specification, the term "a total amount of F contained in the fluoride or fluorides" means ratio of F which can exist in the glass composition when it is calculated as an amount of fluorine atoms, said ratio being expressed as a mass part to the 100 mass parts of the glass calculated on oxide basis.

In the eleventh aspect of the invention, there is provided an optical glass having a refractive index (nd) of 1.60 or over, comprising, as essential components and in mass % to total mass of glass calculated on oxide basis:

| | |
|---|---|
| $SiO_2$ | 25-35% |
| $B_2O_3$ | 5-14.8% |
| BaO | 41-49.8% |
| $Ta_2O_5$ | 0.25-3% |
| ZnO | 1-7% |
| CaO | 1-5% and |
| $Sb_2O_3$ | 0.001-0.1% and | as optional components and in mass % to total mass of glass calculated on oxide basis:

| | |
|---|---|
| $Al_2O_3$ | 0-5% and/or |
| $ZrO_2$ | 0-less than 0.01% and/or |
| $TiO_2$ | 0-0.01% and/or |
| $Nb_2O_5$ | 0-0.01% and/or |
| $WO_3$ | 0-0.01% and/or |
| MgO | 0-6% and/or |
| SrO | 0-6% and/or |
| $Li_2O$ | 0-2% and/or |
| $Na_2O$ | 0-2% and/or |
| $K_2O$ | 0-3% and/or |
| SnO | 0-0.2% and | a fluoride or fluorides of a metal element or elements contained in the above metal oxides, a total amount of F contained in the fluoride or fluorides within a range from 0 to 0.5 mass part to 100 mass parts of the glass calculated on oxide basis, having ratio of $Ta_2O_5/(Ta_2O_5+(ZrO_2+TiO_2+Nb_2O_5+WO_3)\times 5)$ being $0.95<Ta_2O_5/(Ta_2O_5+(ZrO_2+TiO_2+Nb_2O_5+WO_3)\times 5)\leqq 1.00$, and further comprising $SiO_2+B_2O_3+Al_2O_3+BaO$ in a total amount of 81% or over.

In the twelfth aspect of the invention, there is provided an optical glass having a refractive index (nd) of 1.60 or over, comprising, as essential components and in mol % calculated on oxide basis:

| | |
|---|---|
| $SiO_2$ | 45-55% |
| $B_2O_3$ | 8-20% |
| BaO | 20-35% and |
| $Ta_2O_5$ | 0.01-2% and, | as optional components and in mol % calculated on oxide basis,

| | |
|---|---|
| $Al_2O_3$ | 0-10% and/or |
| $ZrO_2$ | 0-less than 0.02% and/or |
| $TiO_2$ | 0-0.02% and/or |
| $Nb_2O_5$ | 0-0.02% and/or |
| $WO_3$ | 0-0.02% and/or |
| $Sb_2O_3$ | 0-0.2% and/or |
| ZnO | 0-10% and/or |
| MgO | 0-15% and/or |
| CaO | 0-15% and/or |
| SrO | 0-15% and/or |
| $Li_2O$ | 0-8% and/or |
| $Na_2O$ | 0-5% and/or |
| $K_2O$ | 0-5% and/or |
| SnO | 0-1% and | a fluoride or fluorides of a metal element or elements contained in the above metal oxides, ratio of mass amount of F contained in the fluoride or fluorides to total mass amount of the glass calculated on oxide basis being within a range from 0 to 0.015.

In the present specification, when the composition calculated on oxide basis is expressed in mol %, it means that, assuming that oxides, complex salts, metal fluorides etc. which are used as raw materials of the glass components of the optical glass of the present invention have all been decomposed and converted to oxides during the melting process, each component of the glass comprises a particular ratio to the total mass amount of the converted oxides which is 100 mol %.

In the thirteenth aspect of the invention, there is provided an optical glass as defined in any of the seventh to the twelfth aspects which is free of a lead compound and an arsenic compound.

In the fourteenth aspect of the invention, there is provided an optical glass as defined in any of the seventh to the thirteenth aspects wherein mean coefficient α of linear thermal expansion within a temperature range from 100° C. to 300° C. is 92 $(10^{-7\circ}\,C.^{-1})$ or below.

In the fifteenth aspect of the invention, there is provided an optical glass as defined in any of the first to the fourteenth aspects wherein the sum of sectional areas of inclusion in glass of 100 ml in accordance with Table 1 of the Japan Optical Glass Industry Standard JOGIS13$^{-1994}$ "Measuring Method for Inclusion in Optical Glass" is within a range from Class 1 to Class 4.

In the sixteenth aspect of the invention, there is provided an optical glass as defined in the fifteenth aspect wherein the sum of sectional areas of inclusion in glass of 100 ml in accordance with Table 1 of the Japan Optical Glass Industry Standard JOGIS13$^{-1994}$ "Measuring Method for Inclusion in Optical Glass" is within a range from Class 1 to Class 3.

In the seventeenth aspect of the invention, there is provided an optical glass as defined in any of the first to the sixteenth aspects having internal transmittance of 0.9900 or over at a wavelength within a range from 400 nm to 450 nm and internal transmittance of 0.9980 or over at a wavelength within a range from 600 nm to 700 nm.

In the eighteenth aspect of the invention, there is provided an optical glass as defined in the seventeenth aspects having internal transmittance of 0.9930 or over at a wavelength within a range from 400 nm to 450 nm and internal transmittance of 0.9990 or over at a wavelength within a range from 600 nm to 700 nm.

In the nineteenth aspect of the invention, there is provided an optical glass as defined in any of the first to the eighteenth aspects wherein no devitrification occurs in glass melt when the glass melt is held for not less than 10 hours under the condition that logarithm log η of viscosity η(dPa·s) of the glass melt is 2.7.

In the twentieth aspect of the invention, there is provided an optical glass as defined in any of the first to the nineteenth aspects having an Abbe number (vd) within a range from 50 to 60.

In the twenty-first aspect of the invention, there is provided a method for manufacturing glass comprising a process of producing a cullet by melting a batch in a melting atmosphere in which oxygen concentration is adjusted to 7% or over.

In the twenty-second aspect of the invention, there is provided a method for manufacturing an optical glass as defined in any of the first to the twentieth aspects, said method comprising a process of producing a cullet by melting a batch in a melting atmosphere in which oxygen concentration is adjusted to 7% or over.

In the twenty-third aspect of the invention, there is provided a core material for an optical fiber comprising an optical glass as defined in any of the seventh to the twentieth aspects.

According to the present invention, there is provided an optical glass which has desired optical constants, is free of PbO and $As_2O_3$ which require costly steps for protection of the environment, has excellent transmittance and a small mean coefficient (α) of linear thermal expansion, and has excellent internal quality and sufficient resistance to devitrification.

Further, according to the invention, there is provided an optical glass which has excellent internal transmittance throughout the visible region and has little inclusion and devitrification and, therefore, is suitable for a core portion of an optical fiber, for the optical glass has small transfer loss, good spinning property and a large numerical aperture. Particularly, the optical glass of the present invention is suitable for use as a core portion which is assembled with a cladding material having excellent adaptability to an autoclave.

BEST MODE FOR CARRYING OUT THE INVENTION

Description will be made about components which the optical glass of the present invention can comprise. Unless otherwise described, the composition ratio of each component will be expressed in mass %.

BaO is one of important components for improving transmittance of the glass, stabilizing the glass and maintaining optical constants during melting. If the amount of this component is greater than 40%, these effects are achieved significantly but excessive addition of this component deteriorates melting property of the glass and increases devitrification. The upper limit of the amount of this component should preferably be 50%, more preferably 49.9% and, most preferably be 49.8% and the lower limit of the amount of this component should preferably be an amount greater than 40%, more preferably 40.5% and, most preferably be 41% respectively to the total mass of the glass calculated on oxide basis. BaO can be incorporated in the glass by using, e.g., $Ba(NO_3)_3$, $BaCO_3$ and $BaF$ as raw materials.

$SiO_2$ is a component added for improving chemical durability and transmittance of the glass. Desired chemical durability and transmittance of the glass can be achieved by adding this component in an amount of 25% or over. Excessive addition of this component, however, deteriorates the melting property of the glass and makes it difficult to maintain the desired optical constants with the result that a glass for achieving the object of the present invention cannot be obtained. The lower limit of the amount of this component should preferably be 25%, more preferably 26% and, most preferably be 27.5% and the upper limit of the amount of this component should preferably be 36%, more preferably be 35% and, most preferably be 34.9%, respectively to the total mass of the glass calculated on oxide basis. $SiO_2$ can be incorporated in the glass by using, e.g., $SiO_2$, $K_2SiF_6$ and $ZrSiO_4$ as raw materials.

$B_2O_3$ is a component added for reducing expansion of the glass and increasing homogeneity of the glass. Addition of this component in an amount of 5% or over can realize a homogeneous glass with reduced expansion. Excessive addition of this component, however, deteriorates chemical durability of the glass. The lower limit of the amount of this component should preferably be 5%, more preferably 5.5% and, most preferably be 6% and the upper limit of the amount of this component should preferably be 20%, more preferably 15% and, most preferably be 14.8%, respectively to the total mass of the glass calculated on oxide basis. $B_2O_3$ can be incorporated in the glass by using, e.g., $H_3BO_3$ as a raw material.

$Al_2O_3$ is a component which is effective for improving chemical durability and reducing expansion. By adding this component in an amount of 10% or below, these effects can be achieved without deteriorating the melting property and resistance to devitrification of the glass and without causing phase separation. The upper limit of the amount of this component should preferably bee 10%, more preferably 5% and, most preferably be 4.8% to the total mass of the glass calculated on oxide bases. $Al_2O_3$ can be incorporated in the glass by using, e.g., $Al(OH)_3$, $Al_2O_3$ and $AlF_3$ as raw materials.

In the optical glass of the present invention, it is very important for obtaining a glass having excellent internal transmittance and small coefficient of linear thermal expansion to add BaO, $SiO_2$, $B_2O_3$ and $Al_2O_3$ in such a manner that sum of amounts of these components will become 81% or over to the total mass of the glass calculated on oxide basis. If the sum of the amounts of these components is lower than 81%, it will become difficult to obtain a glass which has desired optical constants and desired mean coefficient of linear thermal expansion. The sum of these components therefore should be 81% or over, more preferably 82% or over and, most preferably be 83% or over.

$Sb_2O_3$ is an important component for achieving excellent internal transmittance in the glass composition of the present invention. The glass of the present invention, i.e., the $SiO_2$—$B_2O_3$—BaO—$Ta_2O_5$ glass, inherently has good transmittance but, since this glass tends to undergo change readily depending upon conditions of oxidation and reduction in the melting furnace, such, for example, as the type of materials and furnace (i.e., type of fuel) and also the manner of operating the furnace, i.e., temperature, shape of flame and amount of air consumed for combustion), internal transmittance sometimes undergoes change. By adding a suitable amount of $Sb_2O_3$, excellent internal transmittance can be maintained notwithstanding such variation in the oxidation-reduction atmosphere. Excessive addition of this component, however, excessively enhances absorption of $Sb_2O_3$ in the short wavelength region with resulting deterioration in transmittance. In the glass composition of the present invention, the upper limit of the amount of this component should preferably be 0.4%, more preferably 0.3% and, most preferably be 0.15% to the total mass of the glass calculated on oxide bases. No particular lower limit is provided for the amount of this component but it is preferable to add this component in an amount greater than 0%, more preferably 0.001% or over and, most preferably be 0.01% or over. $Sb_2O_3$ can be incorporated in the glass by using, e.g., $Sb_2O_3$ as a raw material.

$Ta_2O_5$ is effective for improving homogeneity and preventing occurrence of phase separation in the $SiO_2$—$B_2O_3$—$BaO$—$Ta_2O_5$ glass of the present invention. This component is also effective for stabilizing the glass during melting and improving resistance to devitrification. Addition of an excessive amount of this component, however, tends to deteriorate transmittance of the glass. For improving transmittance further and obtaining the above described effects comprehensively, the upper limit of the amount of this component should preferably be 5%, more preferably 4% and, most preferably be 2.8% to the total mass of the glass calculated on oxide bases. $Ta_2O_5$ can be incorporated in the glass by using, e.g., $Ta_2O_5$ as a raw material.

The optical glass of the present invention is free of $BaCl_2$, $Nd_2O_3$, $Sm_2O_3$, $As_2O_3$, $CeO_2$, $Fe_2O_3$, and $Pr_2O_3$. These components impart coloring tendency to the glass when they are added to the glass. The optical glass of the present invention is suitable for optical uses such as a light guide, and it is difficult to obtain desired light transmittance of the optical glass if any of these components is contained because of the imparted coloring.

For increasing refractive index without using PbO in the optical glass of the present invention, components such as $ZrO_2$, $TiO_2$, $Nb_2O_5$ and $WO_3$ which impart the glass with a high refractive index may be added as optional components. These components, however, tend to cause phase separation, inclusion and bubbles during melting of the glass and, further, $TiO_2$, $Nb_2O_5$ and $WO_3$ enhance absorption in the short wavelength region. Therefore, addition of an excessive amount of these composition significantly impairs desired optical constants as an optical glass for an optical fiber. Further, $ZrO_2$ has a poor melting property with resulting occurrence of inclusion in the glass and, accordingly, raises the melting temperature of the glass significantly and enhances introduction of Pt ion into the glass with resulting deterioration in transmittance.

The inventors of the present invention have found that, by determining amounts of $Ta_2O_5$, $ZrO_2$, $TiO_2$, $Nb_2O_5$ and $WO_3$ so as to satisfy the formula of $0.95 < Ta_2O_5/(Ta_2O_5+(ZrO_2+TiO_2+Nb_2O_5+WO_3) \times 5) \leq 1.00$ (In the formula, $Ta_2O_5$, $ZrO_2$, $TiO_2$, $Nb_2O_5$ and $WO_3$ represent amounts in mass % of the respective components to the total mass of the glass calculated on oxide basis.), advantageous results of imparting excellent transmittance as an optical glass for an optical fiber, stabilization of the glass during melting and improvement in resistance to devitrification, prevention of introduction of Pt ion into the glass during melting and maintenance of desired refractive index and Abbe number can be achieved.

Accordingly, the upper limit of the amount of each of $ZrO_2$, $TiO_2$, $Nb_2O_5$ and $WO_3$ should preferably be 0.01% and more preferably be 0.005% and most preferably, these components should not be added at all on the condition that the above described formula is satisfied.

ZnO is effective for improving the melting property and water resistance which is one of properties constituting chemical durability and may be added as an optional component to the glass of the present invention. Addition of an excessive amount of this component, however, deteriorates the melting property and transmittance of the glass. The upper limit of the amount of this component should preferably be 10%, more preferably 7% and, most preferably be 6.9% to the total mass of the glass calculated on oxide bases. ZnO can be incorporated in the glass by using, e.g., ZnO as a raw material.

CaO is effective for adjusting the optical constants and improving chemical durability of the glass and may be added as an optional component to the glass of the present invention. Addition of an excessive amount of this component, however, deteriorates the melting property and transmittance of the glass. The upper limit of the amount of this component should preferably be 10%, more preferably 7% and, most preferably be 5% to the total mass of the glass calculated on oxide bases. CaO can be incorporated in the glass by using, e.g., $CaCO_3$ and $CaF_2$ as raw materials.

SrO and MgO are effective for adjusting the optical constants and improving chemical durability of the glass and may be added as optional components to the glass of the present invention. Addition of an excessive amount of these components, however, deteriorates the melting property of the glass. The upper limit of the amount of SrO should preferably be 10%, more preferably 6% and, most preferably be 1% and the upper limit of the amount of MgO should preferably be 10%, more preferably 6% and, most preferably be 5%, respectively to the total mass of the glass calculated on oxide bases. SrO and MgO can be incorporated in the glass by using, e.g., $Sr(NO_3)_2$, $SrF_2$, MgO and $MgF_2$ as raw materials.

$Li_2O$ is effective for improving the melting property of the glass and may be added as an optional component to the glass of the present invention. Addition of an excessive amount of this component, however, deteriorates chemical durability of the glass and increases expansion of the glass. For obtaining a glass with small expansion and excellent transmittance, the upper limit of the amount of this component should preferably be 5%, more preferably 2% and, most preferably be 1.9% to the total mass of the glass calculated on oxide bases. $Li_2O$ can be incorporated in the glass by using, e.g., $Li_2CO_3$ as a raw material.

$Na_2O$ and $K_2O$ are effective for improving the melting property of the glass and may be added as optional components to the glass of the present invention. Addition of an excessive amount of these components, however, deteriorates chemical durability and transmittance of the glass, increases expansion and deteriorates formability of the glass. The upper limit of the amount of $Na_2O$ should preferably be 5%, more preferably 2% and, most preferably be 1% and the upper limit of the amount of $K_2O$ should preferably be 5%, more preferably 3% and, most preferably be 2.5%, respectively to the total mass of the glass calculated on oxide bases. $Na_2O$ can be incorporated in the glass by using, e.g., $Na_2B_4O_7$, $Na_2B_4O_7 \cdot 10H_2O$, $Na_2H_2Sb_2O_7 \cdot 5H_2O$, $Na_2CO_3$ and $NaNO_3$ as raw materials. $K_2O$ can be incorporated in the glass by using, e.g., $K_2CO_3$, $KNO_3$, $KHF_2$ and $K_2SiF_6$ as raw materials.

Addition of a small amount of SnO which acts as a reducing agent makes influence of $Fe^{2+}$ (absorbed over a broad wavelength region centering on 1000 nm) stronger than influence of $Fe^{3+}$ (absorbed in the wavelength region of 430 nm or below) (both $F^{2+}$ and $F^{3+}$ being mixed in small amounts as impurities) and, as a result, deterioration in transmittance in the short wavelength region (400-450 nm) can thereby be prevented. If, however, the amount of SnO exceeds 0.1%, this makes influence of $Cr^{3+}$ (absorbed in the vicinity of 450 nm and 650 nm) stronger than influence of $Cr^{6+}$ (absorbed in the vicinity of 350 nm) (both $Cr^{3+}$ and $Cr^{6+}$ being mixed as impurities) and as a result, absorption in the vicinity of 450 nm and 650 nm increases. Particularly, in a glass which is used with a long transfer path such as an optical fiber used in the visible region (400-700 nm), absorption of impurities of small amounts in the visible region exercises a significant influence as transfer loss. Accordingly, for obtaining a glass having excellent transmittance throughout the visible region, the upper limit of the amount of this component should preferably be 0.2%, more preferably 0.1% and, most preferably be less than 0.01% to the total mass of the glass calculated on oxide bases.

SnO is very effective also for preventing reduction in internal transmittance in the visible region when it is used in combination with $Sb_2O_3$ and in an amount of less than 0.01% in the total amount of these two components. SnO can be incorporated in the glass by using, e.g., SnO as a raw material.

In the optical glass of the present invention, in addition to the above described essential and optional components, $La_2O_3$ and $Y_2O_3$ may be added as optional components in amounts which will not impair achievement of the present invention. These components, however, tend to deteriorate the melting property of the glass seriously and thereby make it difficult to achieve a glass having excellent transmittance, The upper limit of these components should preferably be 2% respectively and, most preferably, these components should not be added.

F is effective for improving transmittance. Addition of this component in an excessive amount, however, deteriorates internal quality and reduces refractive index. Therefore, in the present invention, the upper limit of the amount of this component should preferably be 0.5 mass part, more preferably 0.3 mass part and, most preferably be 0.2 mass part, respectively to 100 mass parts which is the total mass amount of the glass calculated on oxide bases. Most preferably, F should not be added at all. F can be incorporated in the glass by using, e.g., $BaF_2$ and $CaF_2$ as raw materials.

Description will now be made about components which should not be added or preferably should not be added to the optical glass of the present invention.

PbO is effective for improving the melting property of the glass and preventing devitrification of the glass but steps must be taken for protecting the environment in manufacturing, processing and disposing of the glass which will increase the cost significantly. For this reason, PbO should not be added to the glass of the present invention.

$As_2O_3$ is a component which is often used for improving defoaming property of glass in melting. Since, however, steps must be taken for protecting the environment in manufacturing, processing and disposing of the glass which will increase the cost significantly. For this reason, it is not preferable to add $As_2O_3$ to the glass of the present invention.

Pt functions to reduce transmittance in the short wavelength region and, therefore, the amount of Pt in the glass should be held to the minimum. In manufacturing an optical glass, however, it is necessary, from standpoint of refining and homogenizing and freedom in forming of glass, to use a melting apparatus in which a part or whole of portion which comes into contact with melting glass is made of platinum or a platinum alloy and, therefore, when the glass is in contact with platinum in a high temperature and for a long time, platinum ion is introduced into the glass and thereby deteriorates transmittance. For this reason, the amount of Pt in the glass should preferably be 1.5 ppm or below, more preferably 1 ppm or below and, most preferably, the glass should not contain Pt at all.

Since the glass composition of the present invention is expressed in mass %, it cannot be expressed directly in mol %. However, essential components of the glass composition which satisfy properties required for the present invention are expressed in mol % calculated on oxide basis as follows:

| | |
|---|---|
| $SiO_2$ | 45-55% |
| $B_2O_3$ | 8-20% |
| BaO | 20-35% and |
| $Ta_2O_5$ | 0.01-2% |

Optional components expressed in mol % calculated on oxide basis are as follows:

| | |
|---|---|
| $Al_2O_3$ | 0-10% and/or |
| $ZrO_2$ | 0-less than 0.02% and/or |
| $TiO_2$ | 0-0.02% and/or |
| $Nb_2O_5$ | 0-0.02% and/or |
| $WO_3$ | 0-0.02% and/or |
| $Sb_2O_3$ | 0-0.2% and/or |
| ZnO | 0-10% and/or |
| MgO | 0-15% and/or |
| CaO | 0-15% and/or |
| SrO | 0-15% and/or |
| $Li_2O$ | 0-8% and/or |
| $Na_2O$ | 0-5% and/or |
| $K_2O$ | 0-5% and/or |
| SnO | 0-1% and | a fluoride or fluorides of a metal element or elements contained in the above metal oxides, ratio of mass amount of F contained in the fluoride or fluorides to total mass amount of the glass calculated on oxide basis being within a range from 0 to 0.015

In the optical glass of the present invention, $SiO_2$ is effective for improving chemical durability and transmittance. The upper limit of this component should preferably be 55 mol %, more preferably 54 mol % and, most preferably be 53.5 mol % and the lower limit of this component should preferably be 40 mol %, more preferably 40.5 mol % and, most preferably be 41 mol %.

In the optical glass of the present invention, $B_2O_3$ is effective for reducing expansion and improving homogeneity of the glass. The upper limit of this component should preferably be 20 mol %, more preferably 19 mol % and, most preferably be 18 mol % and the lower limit of this component should preferably be 8 mol %, more preferably 8.1 mol % and, most preferably be 8.2 mol %.

In the optical glass of the present invention, BaO is effective for improving transmittance and stabilizing the glass during melting. The upper limit of this component should preferably be 35 mol %, more preferably 31 mol % and, most preferably be 30.5 mol % and the lower limit of this component should preferably be 20 mol %, more preferably 21 mol % and, most preferably be 21.5 mol %.

In the optical glass of the present invention, $Ta_2O_5$ is effective for improving transmittance, stabilizing the glass during melting and improving resistance to devitrification. The upper limit of this component should preferably be 2 mol %, more preferably 1.5 mol % and, most preferably be 1 mol % and the lower limit of this component should preferably be 0.01 mol %, more preferably 0.02 mol % and, most preferably be 0.05 mol %.

In the optical glass of the present invention, $Al_2O_3$ is effective for improving chemical durability and reducing expansion. The upper limit of this component should preferably be 10 mol %, more preferably 5 mol % and, most preferably be 4.5 mol %.

In the optical glass of the present invention, $ZrO_2$ is effective for increasing refractive index and may be added in an amount up to 0.02 mol % and more preferably up to 0.01 mol %. Since, however, this component tends to cause occurrence of inclusion in the glass and deteriorate transmittance, it is most preferable not to add this component at all.

In the optical glass of the present invention, $TiO_2$ is effective for increasing refractive index and may be added in an amount up to 0.02 mol % and more preferably up to 0.01 mol %. Since, however, this component tends to deteriorate transmittance, it is most preferable not to add this component at all.

In the optical glass of the present invention, $Nb_2O_5$ is effective for increasing refractive index and may be added in an amount up to 0.02 mol % and more preferably up to 0.01 mol %. Since, however, this component tends to cause occurrence of phase separation, inclusion and bubbles in the glass, it is most preferable not to add this component at all.

In the optical glass of the present invention, $WO_3$ is effective for increasing refractive index and may be added in an amount up to 0.02 mol % and more preferably up to 0.01 mol %. Since, however, this component tends to cause occurrence of phase separation, inclusion and bubbles in the glass, it is most preferable not to add this component at all.

In the optical glass of the present invention, $Sb_2O_3$ is effective for improving internal transmittance. The upper limit of this component should preferably be 0.2 mol %, more preferably 0.15 mol % and, most preferably be 0.1 mol % and the lower limit of this component should preferably be an amount greater than 0 mol %, more preferably 0.001 mol % and, most preferably be 0.005 mol %.

In the optical glass of the present invention, in addition to the above described essential and optional components, $La_2O_3$ and $Y_2O_3$ may be added as optional components in amounts which will not impair achievement of the present invention. These components, however, tend to deteriorate the melting property of the glass seriously and thereby make it difficult to achieve a glass having excellent transmittance, The upper limit of $La_2O_3$ should preferably be 0.6 mol % and, most preferably, this component should not be added. Likewise, the upper limit of $Y_2O_3$ should preferably be 0.83 mol % and, most preferably, this component should not be added.

In the optical glass of the present invention, ZnO is effective for improving the melting property and reducing expansion. The upper limit of this component should preferably be 10 mol %, more preferably 8 mol % and, most preferably be 7.5 mol %.

In the optical glass of the present invention, MgO is effective for adjusting optical constants and improving chemical durability. The upper limit of this component should preferably be 15 mol %, and more preferably 11 mol %. It is more preferably not to add this component.

In the optical glass of the present invention, CaO is effective for adjusting optical constants and improving chemical durability of the glass and transmittance. The upper limit of this component should preferably be 15 mol %, more preferably 11 mol % and, most preferably be 8.5 mol %.

In the optical glass of the present invention, SrO is effective for adjusting optical constants and improving chemical durability. The upper limit of this component should preferably be 15 mol %, more preferably 11 mol % and, most preferably be 2 mol %.

In the optical glass of the present invention, $Li_2O$ is effective for improving the melting property and thereby obtaining a glass having excellent transmittance. The upper limit of this component should preferably be 8 mol %, more preferably 6 mol % and, most preferably be 5 mol %.

In the optical glass of the present invention, $Na_2O$ is effective for improving the melting property. The upper limit of this component should preferably be 5 mol %, more preferably 3 mol % and, most preferably be 2.5 mol %.

In the optical glass of the present invention, $K_2O$ is effective for improving the melting property. The upper limit of this component should preferably be 5 mol %, more preferably 3 mol % and, most preferably be 2.5 mol %.

In the optical glass of the present invention, SnO is effective for adjusting oxidation and reduction of transition metals mixed as impurities in the glass. The upper limit of this component should preferably be 1 mol %, more preferably 0.8 mol % and, most preferably be 0.7 mol %.

In the optical glass of the present invention, F is effective for improving transmittance. The upper limit of the ratio of amount of this component to total mass amount of the glass calculated on oxide basis should preferably be 0.015, more preferably 0.012 and, most preferably be 0.01.

In addition to the above described components, other components may be added to the extent that such addition will not impair the properties of the glass of the present invention. Transition metal components such as V, Cr, Mn, Fe, Co, Ni, Cu, Ag and Mo, excluding Ti, impart color to the glass when the glass contains these components singly or in combination even in a very small amount with the result that absorption occurs in specific wavelengths in the visible region. In an optical glass using the visible region, therefore, the total amount of these components should preferably be 50 ppm or below and, most preferably, the glass should be substantially free of these components.

For manufacturing the optical glass of the present invention, raw materials of the glass were weighed and mixed in predetermined ratios. The mixed raw materials were put in a quartz crucible and melted at 800° C. to 1300° C. for one to twenty hours for preliminary melting to produce cullet under conditions suitable for the size of the crucible used. The produced cullet was put in an apparatus in which a part or whole of the apparatus which comes into contact with the glass is made of platinum or a platinum alloy and heated at 850° C. to 1300° C. to melt the cullet. The molten cullet was then stirred, homogenized and refined and then was cast into a mold which was preheated at a proper temperature and annealed to produce the desired optical glass.

In the process in which the cullet is produced from a batch, it is important to maintain oxygen concentration of the melting furnace at 7% or over. This is because adjustment of the atmosphere in the process of producing the cullet from the batch influences oxidation-reduction of transition metals significantly. In a state in which the reducing atmosphere is strong with the oxygen concentration in the furnace being below 7%, transition metals such as Cr in the glass are reduced and absorption in the vicinity of 400 nm-450 nm and 600 nm-700 nm disadvantageously becomes large. The oxygen concentration in the furnace preferably is 10% or over and, most preferably, 15% or over. In case control of the oxygen concentration in the furnace is difficult such as in a gas furnace, it is preferable to supply $O_2$ into the furnace through a pipe made of a material such as quartz which does not adversely affect transmittance so as to carry out bubbling and thereby increase the concentration of $O_2$ on the surface of the glass.

For manufacturing an optical fiber by using the cullet which is produced by preliminary melting the optical glass of the present invention, a known method such as the double crucible method may be used.

In the present invention, evaluation of inclusion is made in accordance with the Japan Optical Glass Industry Standard JOJIS13$^{-1994}$ "Measuring Method for Inclusion in Optical Glass". In accordance with Table 1 of this Standard, classification is made on the basis of the sum (mm$^2$) of sectional areas of inclusion in the glass of 100 ml. Inclusion according to this Standard means fine crystals such, for example, as devitrification and platinum fine crystals, fine bubbles and other foreign matters similar thereto. Class 1 represents that the sum of sectional areas of inclusion is less than 0.03 mm$^2$, Class 2 represents that the sum is 0.03—less than 0.1 mm$^2$, Class 3 represents that the sum is 0.1—less than 0.25 mm$^2$, Class 4 represents that the sum is 0.25—less than 0.5 mm$^2$ and Class 5 represents that the sum is 0.5 mm$^2$ or over. As the class becomes larger, inclusion causes more dispersion of light and therefore is not desirable. For realizing desired transmittance in the present invention, the evaluation of inclusion should preferably be Class 1 to Class 4, more preferably Class 1 to Class 3 and, most preferably be Class 1 to Class 2.

The optical glass of the present invention should preferably have as small mean coefficient of linear thermal expansion as possible. If the glass has a large coefficient of thermal expansion, thermal stress becomes large when it is assembled with a cladding material having a small coefficient of thermal expansion with resulting lack in adjustment between the materials. If, further, the optical glass has a large coefficient of thermal expansion when it is used with an optical element, cracks tend to be produced in the grinding process. Accordingly, the optical glass of the present invention should preferably have a mean coefficient ($\alpha$) of linear thermal expansion within the temperature range from 100° C. to 300° C. of 100 ($10^{-7}$° C.$^{-1}$) or below, more preferably 92 ($10^{-7}$° C.$^{-1}$) or below and, most preferably 90 ($10^{-7}$° C.$^{-1}$) or below. Particularly, for matching the optical glass with a cladding material of a multi-component, environmentally friendly material, the mean coefficient should preferable be 92 ($10^{-7}$° C.$^{-1}$) or below.

The optical glass of the present invention should have as high transmittance as possible. If transmittance in the visible region is poor, disadvantages such complexity in the optical design are caused in using the optical glass as an optical element such as an optical lens. It is also important for an optical glass having high transmittance used for an optical fiber to have excellent internal transmittance throughout the visible region. The optical glass of the present invention therefore should preferably have internal transmittance of 0.9900 or over in the wavelength region of 400 nm-450 nm and internal transmittance of 0.9980 or over in the wavelength region of 600 nm-700 nm, more preferably internal transmittance of 0.9920 or over in the wavelength region of 400 nm-450 nm and internal transmittance of 0.9985 or over in the wavelength region of 600 nm-700 nm and, even more preferably internal transmittance of 0.9930 in the wavelength region of 400 nm-450 nm and internal transmittance of 0.9990 or over in the wavelength region of 600 nm-700 nm and, most preferably internal transmittance of 0.9950 or over in the wavelength region of 400 nm-450 nm and internal transmittance of 0.9995 or over in the wavelength region of 600 nm-700 nm.

In the present specification, "internal transmittance in the wavelength region of 400 nm-450 nm" means a minimum value of internal transmittance at each wavelength within the range of 400 nm to 450 nm. Likewise, "internal transmittance in the wavelength region of 600 nm-700 nm" means a minimum value of internal transmittance at each wavelength within the range of 600 nm to 700 nm.

Since the optical glass is influenced significantly by dispersion due to devitrification and phase separation, it should have sufficient resistance to devitrification. More specifically, it is preferable in the optical glass of the present invention that no devitrification occurs in a glass melt when the glass melt is held for not less than 10 hours under the condition that logarithm log $\eta$ of viscosity $\eta$(dPa·s) of the glass melt is 2.7.

For maintaining log $\eta$=2.7 in the optical glass of the present invention, it is necessary to maintain the glass melt generally at a temperature within a range from 850° C. to 900° C. at atmospheric pressure. In evaluating resistance to devitrification of the glass, viscosity can be adjusted by heating the glass to a state in which logarithm of viscosity $\eta$(dPa·s) becomes about log $\eta$=0.8 to 1.0 and then lowering the temperature. An optical glass which causes devitrification under such condition tends to produce devitrification and phase separation in the manufacture of the glass and therefore is not suitable for the optical glass of the present invention. In the present invention, viscosity can be measured by a known ball-pulling-up type viscosity meter.

In the optical glass of the present invention, refractive index should preferably be 1.55 or over for enabling a lens to become thin. In case it is desired to increase numerical aperture for using the optical glass for an optical fiber, the refractive index should preferably be 1.60 or over.

EXAMPLES

Tables 1 to 3 show compositions of Example No. 1 to No. 17 of the optical glass of the present invention together with their refractive index (nd), Abbe number (vd), mean coefficient ($\alpha$) (100° C.-300° C.) of linear thermal expansion, internal transmittance, results of evaluation of inclusion (Class) and results of constant temperature test. These examples are shown by way of illustration only and the present invention is not limited to these examples. In the tables, "oxygen conc. (%)" represents oxygen concentration (%) in melting atmosphere, and "Int. tr." represents internal transmittance.

For manufacturing the glasses of Example No. 1 to No. 17, ordinary high purity raw materials for an optical glass such as oxides, carbonates, nitrates and fluorides were selected, weighed and mixed so as to realize the composition ratio of the respective examples shown in Tables 1 to 3. The mixed raw materials were put in a quartz crucible for preliminary melting and then melted in an apparatus in which a part or whole of a portion which came into contact with the glass was made of platinum or a platinum alloy (a portion of this portion may be made of quartz) at a temperature within a range from 850° C. to 1300° C. Then, the melt was cast into a preheated mold and annealed to produce the glasses of these examples. Samples used for measuring internal transmittance, samples used for measuring mean coefficient of linear thermal expansion and for evaluation of inclusion, and samples used for constant temperature test were prepared from these glasses of the respective examples.

Table 4 shows Comparative Example No. A to No. D which are glasses having the same compositions as the glasses of Example No. 3 of Japanese Patent Application Laid-open Publication No. 8-119666, Example No. 9 of Japanese Patent Application Laid-open Publication No. 2000-264675, Examples No. 8, No. 16 and No. 17 of Japanese Patent Application Laid-open Publication No. 11-92173 but were manufactured with different oxygen concentration (%) in the melting atmosphere. The properties of these glasses were measured in the same manner as in the examples of the present invention. Samples used for measuring internal transmittance, samples used for measuring mean coefficient of linear thermal expansion and for evaluation of inclusion, and samples used for constant temperature test were prepared from these glasses of the respective comparative examples.

Refractive index (nd) and Abbe number (vd) of the glasses of the examples and comparative examples were measured with respect to glasses which were obtained by setting the rate of lowering of annealing temperature at −25° C./Hr.

Mean coefficient ($\alpha$) of linear thermal expansion (100° C.-300° C.) was measured in accordance with the Japan Optical Glass Industry Standard JOGIS08[-2003] "Measuring Method of Thermal Expansion of Optical Glass".

Evaluation of inclusion was made in accordance with the Japan Optical Glass Industry Standard JOJIS13[-1994] "Measuring Method for Inclusion in Optical Glass". In accordance with Table 1 of this Standard, classification was made on the basis of the sum ($mm^2$) of sectional areas of inclusion in the glass of 100 ml. Inclusion according to this Standard means fine crystals such, for example, as devitrification and platinum fine crystals, fine bubbles and other foreign matters similar thereto. Class 1 represents that the sum of sectional areas of inclusion is less than 0.03 $mm^2$, Class 2 represents that the sum is 0.03—less than 0.1 $mm^2$, Class 3 represents that the sum is 0.1—less than 0.25 $mm^2$, Class 4 represents that the sum is 0.25—less than 0.5 $mm^2$ and Class 5 represents that the sum is 0.5 $mm^2$ or over.

Internal transmittance was measured in accordance with the Japan Optical Glass Industry Standard JOGIS17[-1982] "Measuring Method of Internal Transmittance of Optical Glass", i.e., internal transmittance in the wavelength region of 400 nm-450 nm and internal transmittance in the wavelength region of 600 nm-700 nm were measured in two samples of different thickness. In the examples of the present invention, two samples having 10 mm and 40 mm were used.

Viscosity $\eta$(dPa·s) was measured by using a ball-pulling-up type viscosity meter (BVM-13LH made by Yugen Kaisha Opto Kigyo) and the constant temperature test was conducted under adjusted temperature so as to realize the following viscosity. In the constant temperature test, 150 g of glass sample was put in a platinum pot of 50 cc and held for five hours in a state in which logarithm of viscosity $\eta$(dPa·s) became log $\eta$=0.8 to 1.0 and, then, the glass sample was held for ten hours in a state in which log $\eta$ became log $\eta$=2.7. Then, after the glass sample was left for two hours at room temperature, presence or absence of devitrification was observed with a microscope. Glass in which no devitrification was observed is shown with the mark ◯ and glass in which devitrification was observed with the mark X.

In the glass compositions of the present invention, the glass sample was held at a temperature within a range from about 1050° C. to about 1150° C. under atmospheric pressure for realizing log $\eta$=0.8 to 1.0 and it was held at a temperature within a range from about 850° C. to about 900° C. under atmospheric pressure for realizing log $\eta$=2.7.

Adjustment of oxygen concentration in the gas furnace was made by adjusting residual oxygen concentration in the furnace by adjusting flow quantities of gas and air. Measurement of oxygen concentration in the furnace was made by measuring the oxygen concentration on the surface of the glass during melting by using a combustion control tester (MX-512 made by Komyo Rikagaku Kabushiki Kaisha).

TABLE 1

|  | 1 | 2 | 3 | 4 | 5 | 6 | 7 |
|---|---|---|---|---|---|---|---|
| $SiO_2$ | 32.24 | 32.95 | 34.18 | 30.54 | 34.80 | 34.54 | 30.54 |
| $B_2O_3$ | 10.99 | 10.89 | 10.98 | 8.70 | 14.80 | 8.54 | 8.60 |
| $Al_2O_3$ | 3.00 | 2.54 | 2.54 | 1.80 | 4.70 | 3.45 | 3.90 |
| $La_2O_3$ |  |  |  |  |  |  |  |
| $Y_2O_3$ |  |  |  |  |  |  |  |
| $TiO_2$ |  |  |  |  |  |  |  |
| $ZrO_2$ |  |  |  |  |  |  |  |
| ZnO | 4.18 | 4.18 | 4.21 | 6.80 |  | 0.09 | 4.50 |
| MgO |  |  |  | 5.00 |  |  |  |
| CaO | 3.21 | 3.30 | 3.33 | 4.56 | 1.23 |  | 0.50 |
| BaO | 42.00 | 41.98 | 42.32 | 41.20 | 41.77 | 49.77 | 48.77 |
| $Li_2O$ | 0.93 | 0.93 | 0.94 | 0.50 | 1.80 |  | 0.50 |
| $Na_2O$ | 0.37 | 0.10 | 0.10 | 0.20 | 0.39 |  |  |
| $K_2O$ | 0.48 | 0.38 | 0.38 |  |  | 2.30 | 1.80 |
| $Sb_2O_3$ | 0.10 | 0.005 | 0.009 | 0.001 | 0.006 | 0.009 | 0.300 |
| $Ta_2O_5$ | 2.50 | 2.74 | 1.01 | 0.70 | 0.30 | 1.00 | 0.50 |
| PbO |  |  |  |  |  |  |  |
| $As_2O_3$ |  |  |  |  |  |  |  |
| SnO |  | 0.004 |  | 0.008 | 0.003 |  | 0.100 |
| SrO |  |  |  |  |  | 0.30 |  |
| Total | 100 | 100 | 100 | 100 | 100 | 100 | 100 |
| F |  |  |  |  | 0.20 |  |  |
| $SiO_2 + B_2O_3 + Al_2O_3 + BaO$ | 88.23 | 88.36 | 90.02 | 82.24 | 96.07 | 96.30 | 91.80 |
| $Ta_2O_5/(Ta_2O_5 + (ZrO_2 + TiO_2 + Nb_2O_5 + WO_3) \times 5)$ | 1.0000 | 1.0000 | 1.0000 | 1.0000 | 1.0000 | 1.0000 | 1.0000 |
| Oxygen conc.(%) | 10 | 20 | 20 | 10 | 20 | 20 | 8 |
| nd | 1.6316 | 1.6341 | 1.6252 | 1.6413 | 1.6197 | 1.6118 | 1.6266 |
| vd | 56.0 | 56.0 | 57.0 | 54.0 | 59.1 | 59.0 | 55.6 |
| $\alpha$ | 85 | 85 | 84 | 89 | 86 | 89 | 88 |
| Int. tr. (400~450 nm) | 0.9985 | 0.9995 | 0.9994 | 0.9984 | 0.9994 | 0.9994 | 0.9984 |
| Int. tr. (600~700 nm) | 0.9997 | 0.9999 | 1.0000 | 0.9996 | 0.9999 | 1.0000 | 0.9995 |
| Inclusion | 1 | 1 | 1 | 1 | 1 | 1 | 1 |
| Constant temperature test | ◯ | ◯ | ◯ | ◯ | ◯ | ◯ | ◯ |

TABLE 2

|  | 8 | 9 | 10 | 11 | 12 | 13 | 14 |
|---|---|---|---|---|---|---|---|
| $SiO_2$ | 30.54 | 30.54 | 28.00 | 27.50 | 29.00 | 30.54 | 33.04 |
| $B_2O_3$ | 8.70 | 6.20 | 8.53 | 12.00 | 9.20 | 8.94 | 11.00 |
| $Al_2O_3$ | 3.30 | 4.50 | 4.50 | 4.80 | 3.34 | 2.50 | 2.25 |
| $La_2O_3$ |  | 0.50 |  |  |  |  |  |
| $Y_2O_3$ |  |  |  | 0.30 |  |  |  |
| $TiO_2$ |  |  |  |  |  |  |  |
| $ZrO_2$ |  |  |  |  |  |  |  |
| ZnO | 4.70 | 4.30 | 5.00 | 5.00 | 4.90 | 3.80 | 3.40 |
| MgO | 0.30 |  |  | 1.00 | 1.50 |  |  |
| CaO | 0.40 | 2.00 | 1.70 | 0.75 | 4.90 | 4.80 | 5.00 |
| BaO | 48.77 | 48.78 | 48.80 | 46.49 | 45.82 | 46.87 | 43.21 |
| $Li_2O$ | 0.50 | 0.43 | 0.50 | 0.30 | 0.50 | 1.05 | 1.25 |
| $Na_2O$ | 1.00 | 0.05 | 0.61 | 0.50 | 0.14 |  | 0.15 |
| $K_2O$ | 0.90 | 1.80 | 1.80 | 0.50 |  |  |  |
| $Sb_2O_3$ | 0.005 | 0.004 | 0.005 | 0.150 | 0.004 | 0.005 | 0.009 |
| $Ta_2O_5$ | 0.89 | 0.90 | 0.25 | 1.00 | 0.69 | 0.50 | 0.70 |
| PbO |  |  |  |  |  |  |  |
| $As_2O_3$ |  |  |  |  |  |  |  |
| SnO | 0.004 | 0.003 | 0.002 | 0.010 | 0.004 |  |  |
| SrO |  |  |  |  |  | 1.00 |  |
| Total | 100 | 100 | 100 | 100 | 100 | 100 | 100 |
| F |  |  |  |  |  |  |  |
| $SiO_2 + B_2O_3 + Al_2O_3 + BaO$ | 91.30 | 90.02 | 89.83 | 90.79 | 87.36 | 88.85 | 89.50 |
| $Ta_2O_5/(Ta_2O_5 + (ZrO_2 + TiO_2 + Nb_2O_5 + WO_3) \times 5)$ | 1.0000 | 1.0000 | 1.0000 | 1.0000 | 1.0000 | 1.0000 | 1.0000 |
| Oxygen conc.(%) | 20 | 13 | 14 | 12 | 14 | 20 | 9 |
| nd | 1.6251 | 1.6333 | 1.6327 | 1.6386 | 1.6443 | 1.6449 | 1.6298 |
| νd | 55.1 | 54.5 | 54.8 | 54.6 | 53.9 | 53.9 | 57.2 |
| α | 88 | 90 | 89 | 84 | 88 | 90 | 87 |
| Int. tr. (400~450 nm) | 0.9997 | 0.9989 | 0.9990 | 0.9987 | 0.9989 | 0.9993 | 0.9986 |
| Int. tr. (600~700 nm) | 0.9999 | 0.9997 | 0.9999 | 0.9996 | 0.9998 | 0.9999 | 0.9998 |
| Inclusion | 1 | 2 | 2 | 1 | 1 | 1 | 1 |
| Constant temperature test | ○ | ○ | ○ | ○ | ○ | ○ | ○ |

TABLE 3

|  | 15 | 16 | 17 |
|---|---|---|---|
| $SiO_2$ | 28.54 | 34.17 | 34.17 |
| $B_2O_3$ | 10.19 | 10.98 | 10.98 |
| $Al_2O_3$ | 1.50 | 2.54 | 2.54 |
| $La_2O_3$ |  |  |  |
| $Y_2O_3$ |  |  |  |
| $TiO_2$ |  |  |  |
| $ZrO_2$ |  |  |  |
| ZnO | 6.35 | 4.21 | 4.21 |
| MgO |  |  |  |
| CaO | 5.00 | 3.33 | 3.33 |
| BaO | 46.52 | 42.32 | 42.32 |
| $Li_2O$ | 0.38 | 0.94 | 0.94 |
| $Na_2O$ |  | 0.10 | 0.10 |
| $K_2O$ | 0.58 | 0.38 | 0.38 |
| $Sb_2O_3$ | 0.050 | 0.005 | 0.009 |
| $Ta_2O_5$ | 0.85 | 1.02 | 1.02 |
| PbO |  |  |  |
| $As_2O_3$ |  |  |  |
| SnO | 0.050 | 0.004 |  |
| SrO |  |  |  |
| Total | 100 | 100 | 100 |
| F |  |  |  |
| $SiO_2 + B_2O_3 + Al_2O_3 + BaO$ | 86.75 | 90.01 | 90.01 |
| $Ta_2O_5/(Ta_2O_5 + (ZrO_2 + TiO_2 + Nb_2O_5 + WO_3) \times 5)$ | 1.0000 | 1.0000 | 1.0000 |
| Oxygen conc.(%) | 20 | 20 | 25 |
| nd | 1.6426 | 1.6252 | 1.6252 |
| νd | 55.1 | 57.1 | 57.1 |
| α | 90 | 86 | 86 |
| (400~450 nm) | 0.9991 | 0.9995 | 0.9998 |
| Int. tr. (600~700 nm) | 0.9999 | 0.9999 | 1.0000 |
| Inclusion | 1 | 1 | 1 |
| Constant temperature test | ○ | ○ | ○ |

TABLE 4

|  | Comparative Example A | Comparative Example B | Comparative Example C | Comparative Example D |
|---|---|---|---|---|
| $SiO_2$ | 32.30 | 30.00 | 30.00 | 34.17 |
| $B_2O_3$ | 12.90 | 1.50 | 2.50 | 10.98 |
| $Al_2O_3$ | 4.60 | 8.00 | 5.00 | 2.54 |
| $La_2O_3$ |  |  |  |  |
| $Y_2O_3$ |  |  |  |  |
| $TiO_2$ |  | 0.03 |  |  |
| $ZrO_2$ | 1.70 | 0.50 | 2.50 |  |
| ZnO | 1.00 | 0.10 | 9.00 | 4.21 |
| MgO | 2.60 |  |  |  |
| CaO |  | 15.00 | 8.00 | 3.33 |

TABLE 4-continued

|  | Comparative Example A | Comparative Example B | Comparative Example C | Comparative Example D |
|---|---|---|---|---|
| BaO | 42.40 | 41.00 | 32.00 | 42.32 |
| $Li_2O$ | 1.80 | 0.50 |  | 0.94 |
| $Na_2O$ | 0.20 | 2.00 | 8.00 | 0.10 |
| $K_2O$ | 0.30 |  |  | 0.38 |
| $Sb_2O_3$ | 0.20 | 0.37 |  | 0.009 |
| $Ta_2O_5$ |  | 1.00 | 2.90 | 1.02 |
| PbO |  |  | 0.10 |  |
| $As_2O_3$ |  |  |  |  |
| Total | 100.00 | 100.00 | 100.00 | 100.00 |
| $SiO_2 + B_2O_3 + Al_2O_3 + BaO$ | 92.20 | 80.50 | 69.50 | 90.01 |
| $Ta_2O_5/(Ta_2O_5 + (ZrO_2 + TiO_2 + Nb_2O_5 + WO_3) \times 5)$ | 0.00 | 0.27 | 0.19 | 1.00 |
| Oxygen conc.(%) | 20 | 20 | 20 | 4 |
| nd | 1.6341 | 1.6234 | 1.6300 | 1.6252 |
| νd | 56.0 | 57.5 | 55.9 | 57.1 |
| α | 81 | 97 | 110 | 86 |
| Int. tr. (400~450 nm) | 0.9948 | 0.9942 | 0.9949 | 0.9976 |
| Int. tr. (600~700 nm) | 0.9987 | 0.9950 | 0.9960 | 0.9981 |
| Inclusion | 4 | 4 | 4 | 1 |
| Constant temperature test | X | X | ○ | ○ |

As shown in Tables 1 to 3 and Table 4, the optical glasses of Example No. 1 to No. 17 have better transmittance, smaller coefficients α (100-300° C.) of linear thermal expansion, better internal quality and resistance to devitrification than the glasses of Comparative Example No. A to No. D.

INDUSTRIAL APPLICABILITY

The optical glass of the present invention is suitable for use as a core portion of an optical fiber and, particularly, as a core portion which is assembled with a cladding portion having excellent adaptability to an autoclave.

I claim:

1. An optical glass for a light guide, an image guide or a glass lens for an exposure device for semiconductors comprising each of $SiO_2$, $B_2O_3$, BaO, and $Ta_2O_5$,
    $La_2O_3$ in an amount of 0-2 mass % and
    $Nb_2O_5$ in an amount of 0-0.01 mass %,
    wherein the optical glass is free of a lead compound, an arsenic compound, $BaCl_2$, $Nd_2O_3$, $Sm_2O_3$, $As_2O_3$, $CeO_2$, $Fe_2O_3$ and $Pr_2O_3$,
    the optical glass having the ratio of $Ta_2O_5/(Ta_2O_5+(ZrO_2+TiO_2+Nb_2O_5+WO_3)\times5)$ being $0.95<Ta_2O_5/(Ta_2O_5+(ZrO_2+TiO_2+Nb_2O_5+WO_3)\times5)\leq1.00$) and
    having internal transmittance of 0.9900 or over at a wavelength within a range from 400 nm to 450 nm and internal transmittance of 0.9980 or over at a wavelength within a range from 600 nm to 700 nm as measured respectively in accordance with the Japan Optical Glass Industry Standard JOGIS17$^{-1982}$ "Measuring Method of Internal Transmittance of Optical Glass" by using two samples having thicknesses of 10 mm and 40 mm, and having a refractive index of 1.55 or over,
    wherein the optical glass is a core material of an optical fiber.

2. The optical glass as defined in claim 1, wherein difference in mean coefficient α of linear thermal expansion between the core material and a cladding material for the optical fiber used simultaneously with the core material within a temperature range from 100° C. to 300° C. is within a range from −15 ($10^{-7\circ}$ C.$^{-1}$) to +15($10^{-7\circ}$ C.$^{-1}$).

3. An optical glass for a light guide, an image guide or a glass lens for an exposure device for semiconductors, comprising, in mass of glass calculated on oxide basis:
    $Ta_2O_5$ 0.1-4 mass %, and
    at least one of $SiO_2$, $B_2O_3$, $Al_2O_3$, and BaO in a total amount of 81% or over, and
    wherein ratio of $Ta_2O_5/(Ta_2O_5+(ZrO_2+TiO_2+Nb_2O_5+WO_3)\times5)$ is $0.95<Ta_2O_5/(Ta_2O_5+(ZrO_2+TiO_2+Nb_2O_5+WO_3)\times5)\leq1.00$, and
    the optical glass is free of $BaCl_2$, $Nd_2O_3$, $Sm_2O_3$, $As_2O_3$, $CeO_2$, $Fe_2O_3$, and $Pr_2O_3$,
    wherein the optical glass is a core material for an optical fiber.

4. An optical glass for a light guide, an image guide or a glass lens for an exposure device for semiconductors, comprising, in mass of glass calculated on oxide basis:

| BaO | more than 40 to 50 mass %, |
|---|---|
| $Ta_2O_5$ | 0.1-4 mass %, | at least one of $SiO_2$, $B_2O_3$, $Al_2O_3$, and BaO in a total amount of 81% or over, and
    wherein ratio of $Ta_2O_5/(Ta_2O_5+(ZrO_2+TiO_2+Nb_2O_5+WO_3)\times5)$ is $0.95<Ta_2O_5/(Ta_2O_5+(ZrO_2+TiO_2+Nb_2O_5+WO_3)\times5)\leq1.00$, and
    the optical glass is free of $BaCl_2$, $Nd_2O_3$, $Sm_2O_3$, $As_2O_3$, $CeO_2$, $Fe_2O_3$, and $Pr_2O_3$.

5. An optical glass for a light guide, an image guide or a glass lens for an exposure device for semiconductors having a refractive index (nd) of 1.60 or over, comprising, in mass % to total mass of glass calculated on oxide basis:

| | |
|---|---|
| SiO₂ | 25-36%, |
| B₂O₃ | 5-20%, |
| BaO | greater than 40% and not more than 50%, |
| Ta₂O₅ | 0.1-4%, and | wherein ratio of Ta₂O₅/(Ta₂O₅+(ZrO₂+TiO₂+Nb₂O₅+WO₃)×5) is 0.95<Ta₂O₅/(Ta₂O₅+(ZrO₂+TiO₂+Nb₂O₅+WO₃)×5)≦1.00, wherein a total amount of (SiO₂+B₂O₃+Al₂O₃+BaO) is 81% or over, and the glass is free of BaCl₂, Nd₂O₃, Sm₂O₃, As₂O₃, CeO₂, Fe₂O₃, and Pr₂O₃.

6. An optical glass for a light guide, an image guide or a glass lens for an exposure device for semiconductors having a refractive index (nd) of 1.60 or over, comprising, in mass % to total mass of glass calculated on oxide basis:

| | |
|---|---|
| SiO₂ | 25-36% |
| B₂O₃ | 5-20% |
| BaO | greater than 40% and not more than 50%, |
| Ta₂O₅ | 0.1-4%, |
| Al₂O₃ | 0-10%, |
| ZrO₂ | 0-less than 0.01%, |
| TiO₂ | 0-0.01%, |
| Nb₂O₅ | 0-0.01%, |
| WO₃ | 0-0.01%, |
| Sb₂O₃ | 0-0.4%, |
| ZnO | 0-10%, |
| MgO | 0-10%, |
| CaO | 0-10%, |
| SrO | 0-10%, |
| Li₂O | 0-5%, |
| Na₂O | 0-5%, |
| K₂O | 0-5%, and | a fluoride or fluorides of a metal element or elements contained in the above metal oxides, a total amount of F contained in the fluoride or fluorides within a range from 0 to 0.5 mass part to 100 mass parts of the glass calculated on oxide basis, wherein ratio of Ta₂O₅/(Ta₂O₅+(ZrO₂+TiO₂+Nb₂O₅+WO₃)×5) is 0.95<Ta₂O₅/(Ta₂O₅+(ZrO₂+TiO₂+Nb₂O₅+WO₃)×5)≦1.00, and a total amount of (SiO₂+B₂O₃+Al₂O₃+BaO) is 81% or over, and the optical glass is free of BaCl₂, Nd₂O₃, Sm₂O₃, As₂O₃, CeO₂, Fe₂O₃, and Pr₂O₃.

7. An optical glass for a light guide, an image guide or a glass lens for an exposure device for semiconductors having a refractive index (nd) of 1.60 or over, comprising, in mass % to total mass of glass calculated on oxide basis:

| | |
|---|---|
| SiO₂ | 25-35%, |
| B₂O₃ | 5-14.8%, |
| BaO | 41-49.8%, |
| Ta₂O₅ | 0.25-3%, |
| ZnO | 1-7%, |
| CaO | 1-5%, |
| Sb₂O₃ | 0.001-0.1%, |
| Al₂O₃ | 0-5%, |
| ZrO₂ | 0-less than 0.01%, |
| TiO₂ | 0-0.01%, |
| Nb₂O₅ | 0-0.01%, |
| WO₃ | 0-0.01%, |
| MgO | 0-6%, |
| SrO | 0-6%, |
| Li₂O | 0-2%, |
| Na₂O | 0-2%, |
| K₂O | 0-3%, |
| SnO | 0-0.2, and | a fluoride or fluorides of a metal element or elements contained in the above metal oxides, a total amount of F contained in the fluoride or fluorides within a range from 0 to 0.5 mass part to 100 mass parts of the glass calculated on oxide basis, wherein ratio of Ta₂O₅/(Ta₂O₅+(ZrO₂+TiO₂+Nb₂O₅+WO₃)×5) is 0.95<Ta₂O₅/(Ta₂O₅+(ZrO₂+TiO₂+Nb₂O₅+WO₃)×5)≦1.00, a total amount of (SiO₂+B₂O₃+Al₂O₃+BaO) is 81% or over, and the glass is free of BaCl₂, Nd₂O₃, Sm₂O₃, As₂O₃, CeO₂, Fe₂O₃, and Pr₂O₃.

8. An optical glass for a light guide, an image guide or a glass lens for an exposure device for semiconductors having a refractive index (nd) of 1.60 or over, comprising, in mol % calculated on oxide basis:

| | |
|---|---|
| SiO₂ | 40-55%, |
| B₂O₃ | 8-20%, |
| BaO | 20-35%, |
| Ta₂O₅ | 0.01-2%, |
| Al₂O₃ | 0-10%, |
| ZrO₂ | 0-less than 0.02%, |
| TiO₂ | 0-0.02%, |
| Nb₂O₅ | 0-0.01, |
| WO₃ | 0-0.02, |
| Sb₂O₃ | 0-0.2%, |
| ZnO | 0-10%, |
| MgO | 0-15%, |
| CaO | 0-15%, |
| SrO | 0-15%, |
| Li₂O | 0-8%, |
| Na₂O | 0-5%, |
| K₂O | 0-5%, |
| SnO | 0-1%, and | a fluoride or fluorides of a metal element or elements contained in the above metal oxides, ratio of mass amount of F contained in the fluoride or fluorides to total mass amount of the glass calculated on oxide basis being within a range from 0 to 0.015, wherein ratio of Ta₂O₅/(Ta₂O₅+(ZrO₂+TiO₂+Nb₂O₅+WO₃)×5) is 0.95<Ta₂O₅/(Ta₂O₅+(ZrO₂+TiO₂+Nb₂O₅+WO₃)×5)≦1.00, and the glass is free of BaCl₂, Nd₂O₃, Sm₂O₃, As₂O₃, CeO₂, Fe₂O₃, and Pr₂O₃.

9. The optical glass as defined in any of claims 4-8 which is free of a lead compound and an arsenic compound.

10. The optical glass as defined in any of claims 4-8 wherein mean coefficient α of linear thermal expansion within a temperature range from 100° C. to 300° C. is 92 (10⁻⁷° C.⁻¹) or below.

11. The optical glass as defined in any one of claims 7-8, wherein the sum of sectional areas of inclusion in glass of 100 ml in accordance with Table 1 of the Japan Optical Glass Industry Standard JOGIS13$^{-1994}$ "Measuring Method for Inclusion in Optical Glass" is within a range from Class 1 to Class 4.

12. The optical glass as defined in claim 11, wherein the sum of sectional areas of inclusion in glass of 100 ml in accordance with Table 1 of the Japan Optical Glass Industry Standard JOGIS13$^{-1994}$ "Measuring Method for Inclusion in Optical Glass" is within a range from Class 1 to Class 3.

13. The optical glass as defined in any of claims 4-8, having internal transmittance of 0.9900 or over at a wavelength within a range from 400 nm to 450 nm and internal transmittance of 0.9980 or over at a wavelength within a range from 600 nm to 700 nm as measured respectively in accordance with the Japan Optical Glass Industry Standard JOGIS17$^{-1982}$ "Measuring Method of Internal Transmittance of Optical Glass" by using two samples having thicknesses of 10 mm and 40 mm.

14. The optical glass as defined in claim 13 having internal transmittance of 0.9930 or over at a wavelength within a range from 400 nm to 450 nm and internal transmittance of 0.9990 or over at a wavelength within a range from 600 nm to 700 nm.

15. The optical glass as defined in any one of claims 4-8, wherein no devitrification occurs in glass melt when the glass melt is held for not less than 10 hours under the condition that logarithm log η of viscosity η (dPa·s) of the glass melt is 2.7.

16. The optical glass as defined in any one of claims 4-8, wherein the optical glass has an Abbe number (νd) within a range from 50 to 60.

17. The optical glass as defined in any of claims 4-8, wherein the optical glass is a core material for an optical fiber.

\* \* \* \* \*